United States Patent
Toshiaki

(10) Patent No.: US 7,950,314 B2
(45) Date of Patent: May 31, 2011

(54) METHOD OF CUTTING SHEET MATERIALS

(75) Inventor: Morita Toshiaki, Wakayama (JP)

(73) Assignee: Shima Seiki Manufacturing, Ltd., Wakayama (JP)

( * ) Notice: Subject to any disclaimer, the term of this patent is extended or adjusted under 35 U.S.C. 154(b) by 361 days.

(21) Appl. No.: 10/540,922

(22) PCT Filed: Dec. 26, 2003

(86) PCT No.: PCT/JP03/17092
§ 371 (c)(1),
(2), (4) Date: Jun. 29, 2005

(87) PCT Pub. No.: WO2004/062858
PCT Pub. Date: Jul. 29, 2004

(65) Prior Publication Data
US 2006/0081098 A1      Apr. 20, 2006

(30) Foreign Application Priority Data

Jan. 10, 2003   (JP) .................................. 2003-004575

(51) Int. Cl.
*B26D 7/01*    (2006.01)
*B26D 7/10*    (2006.01)
*B29C 65/74*   (2006.01)
*D06H 7/00*    (2006.01)
*B26D 1/10*    (2006.01)

(52) U.S. Cl. ............. 83/16; 83/14; 83/29; 83/30; 83/39; 83/170; 83/171; 83/451; 83/941; 156/250

(58) Field of Classification Search .............. 83/14–16, 83/29, 30, 34, 35, 39, 56, 170, 171, 451, 83/936, 939–941; 156/244.18, 244.19, 250, 156/510, 526
See application file for complete search history.

(56) References Cited

U.S. PATENT DOCUMENTS

| | | | | |
|---|---|---|---|---|
| 1,869,550 A | * | 8/1932 | Dorogi et al. | 156/510 |
| 3,540,341 A | * | 11/1970 | Sederberg | 83/563 |
| 3,573,859 A | * | 4/1971 | Sederberg | 83/34 |
| 3,697,357 A | * | 10/1972 | Obeda | 156/510 |
| 3,732,764 A | * | 5/1973 | Gerber | 83/34 |
| 3,753,380 A | * | 8/1973 | Lee | 83/315 |
| 3,780,607 A | | 12/1973 | Gerber | |
| 3,830,122 A | * | 8/1974 | Pearl | 83/169 |
| 3,893,881 A | * | 7/1975 | Gerber et al. | 156/250 |
| 4,091,701 A | * | 5/1978 | Pearl | 83/747 |

(Continued)

FOREIGN PATENT DOCUMENTS

| | | | | |
|---|---|---|---|---|
| JP | 62-170324 | * | 7/1987 | 156/250 |

(Continued)

*Primary Examiner* — Clark F. Dexter
(74) *Attorney, Agent, or Firm* — Rothwell, Figg, Ernst & Manbeck

(57) ABSTRACT

At the time of cutting stacked sheet members, a knife or a punch pierces the sheet members at positions such as along a cutting line, in a region outside the cutting line, or in a seam allowance inside the cutting line. By moving the knife or the punch vertically, heat is applied to the sheet members such that the seam members are welded (i.e., fused) together vertically. Even if at the time of cutting stacked sheet members having low air permeability, it is possible to prevent warpage or slippage of the sheet members, and cutting is performed accurately.

3 Claims, 3 Drawing Sheets

U.S. PATENT DOCUMENTS

| | | | |
|---|---|---|---|
| 4,133,235 A | * | 1/1979 | Gerber .............................. 83/74 |
| 4,200,015 A | * | 4/1980 | Gerber .............................. 83/22 |
| 4,201,101 A | * | 5/1980 | Gerber .............................. 83/22 |
| RE30,757 E | * | 10/1981 | Gerber .............................. 83/74 |
| 4,373,412 A | * | 2/1983 | Gerber et al. ..................... 83/24 |
| 4,653,362 A | * | 3/1987 | Gerber .............................. 83/16 |
| 5,087,236 A | * | 2/1992 | Morimoto ..................... 493/342 |
| 5,791,216 A | * | 8/1998 | Hada et al. ........................ 83/13 |

FOREIGN PATENT DOCUMENTS

| | | |
|---|---|---|
| JP | 63-100602 A | 5/1988 |
| JP | 7-112081 A | 5/1995 |

* cited by examiner

METHOD OF CUTTING SHEET MATERIALS

CROSS REFERENCE TO RELATED APPLICATION

This application is a 35 USC §371 National Phase Entry Application from PCT/JP2003/017092, filed Dec. 26, 2003, and designating the United States.

TECHNICAL FIELD

The present invention relates to cutting of sheet members.

BACKGROUND ART

At the time of cutting sheet members, the sheet members are fixed by vacuum suction or the like, and the sheet members are cut by a knife or a round blade. According to the disclosure of Patent Publication 1 (Japanese Laid-Open Patent Publication No. 9-103991, U.S. Pat. No. 5,791,216), a sheet member is cut efficiently using both of a circular blade and a knife appropriately. The blade width of the knife is smaller than that of the round blade. According to the disclosure of Patent Publication 2 (Japanese Laid-Open Patent Publication No. 48-74683, U.S. Pat. No. 3,780,607), at the time of cutting a sheet member made of material having a low melting point such as vinyl chloride, since a cutting blade is not pulled out from the sheet member, the frictional heat is released through the cutting blade, and fusion of the sheet member is prevented. That is, if fusion of the sheet member occurs, problems may occur. For example, it happens that the sheet member is adhered to another sheet member, and patterns such as a printing pattern disappear. The surface of the sheet member may become rough, and the cutting line may become unclear. Therefore, the cutting blade is used for releasing the heat to prevent fusion.

However, at the time of cutting stacked sheet members made of material having low permeability such as vinyl chloride or synthetic leather, the upper sheet members are not sufficiently fixed by vacuum suction. The upper sheet members may warp, or may slide on the other sheet members undesirably. Thus, it may not be possible to cut the sheet members accurately.

SUMMARY OF THE INVENTION

An object of the present invention is to achieve accurate cutting, even if slippery sheet members are stacked together.

In the sheet member cutting method, at the time of fixedly stacking a plurality of sheet members and cutting the sheet members along a predetermined cutting line toward a part, a seam allowance of the part or a region outside the seam allowance of the part, near the cutting line is heated locally such that the sheet members are welded (i.e., fused) together vertically to fix upper and lower sheet members.

Preferably, the local heating is performed using a knife or a punch of a cutting head. For example, the knife pierces through the stacked sheet members, and the knife moves vertically at the same position such that the upper and lower sheet members are welded together vertically by the friction between the knife and the sheet members. Further, if a drill-shaped punch is used to dig the stacked sheet members (make a hole in the stacked sheet members), by rotating the punch, it is possible to weld the sheet members. Alternatively, if a punch having a reciprocating blade is used to pierce the sheet members, by moving the punch vertically in the same manner as in the case of the cutting knife, it is possible to weld the sheet members.

Further, preferably, the local heating is performed along the cutting line or in a region slightly outside the cutting line at several positions for each part.

Further, preferably, the local heating is performed in a seam allowance inside the cutting line at several positions for each part.

The "several positions for one part" herein means, for example, two to ten positions, preferably, three to six positions for each part.

Further, in a sheet member cutting method according to the invention, at the time of fixedly stacking a plurality of sheet members and cutting the sheet members along a predetermined cutting line toward a part, the cutting is performed such that a plurality of uncut portions are formed along the cutting line, and then, the uncut portions are cut.

The present invention is particularly effective if the sheet members are made of material having air impermeability, such as vinyl chloride or synthetic leather, or other material (fabric) that has been subjected to a treatment for air impermeability. The meaning of the material having "air impermeability" is not limited to the material which does not allow the air to pass through at all, and includes the material having a low permeability.

OPERATION AND ADVANTAGES OF THE INVENTION

In the present invention, the cutting is performed after the sheet members are welded together vertically, or uncut portions are provided along the cutting line. Therefore, even if slippery sheet members of material having air impermeability such as vinyl chloride or synthetic leather are used, the cutting can be performed accurately. Further, if sheet members having air permeability are used, the sheet members are fixed easily. In the case of fixing the sheet members by vacuum suction, it is possible to minimize the suction force. The welding positions are provided along the cutting line, slightly outside the cutting line, or in the seam allowance inside the cutting line. Therefore, no trace of welding is exposed in the part.

If the knife or the punch provided for the cutting head of the cutting apparatus is used for vertically welding the sheet members together, the welding can be performed easily by the normal cutting head.

The welding is performed at several positions, e.g., two to ten positions, preferably, three to six positions for each part. The welding positions are provided along the cutting line, slightly outside the cutting line, or in the seam allowance of the part inside the cutting line. The slightly outside herein means, e.g., a region outside the cutting line, which is not remote perpendicularly from the cutting line beyond 5 mm. Further, if the region just outside the cutting line is used for another part, it is preferable that the welding positions are provided along the cutting line or in the seam allowance inside the cutting line.

It is advantageous that the sheet members used in the present invention have air impermeability. It is difficult to fix the sheet members of this type by vacuum suction. The sheet members are slippery due to the air present between the sheet members. However, most materials of the sheet members having air impermeability, such as vinyl chloride, synthetic leather, nylon, or polyester are easily fused by heat, and welded easily. Thus, in the present invention, even if the sheet members having air impermeability which cannot be fixed easily are used, the sheet members are stacked vertically, and it is possible to cut the sheet members accurately.

EMBODIMENTS

Figure 1:
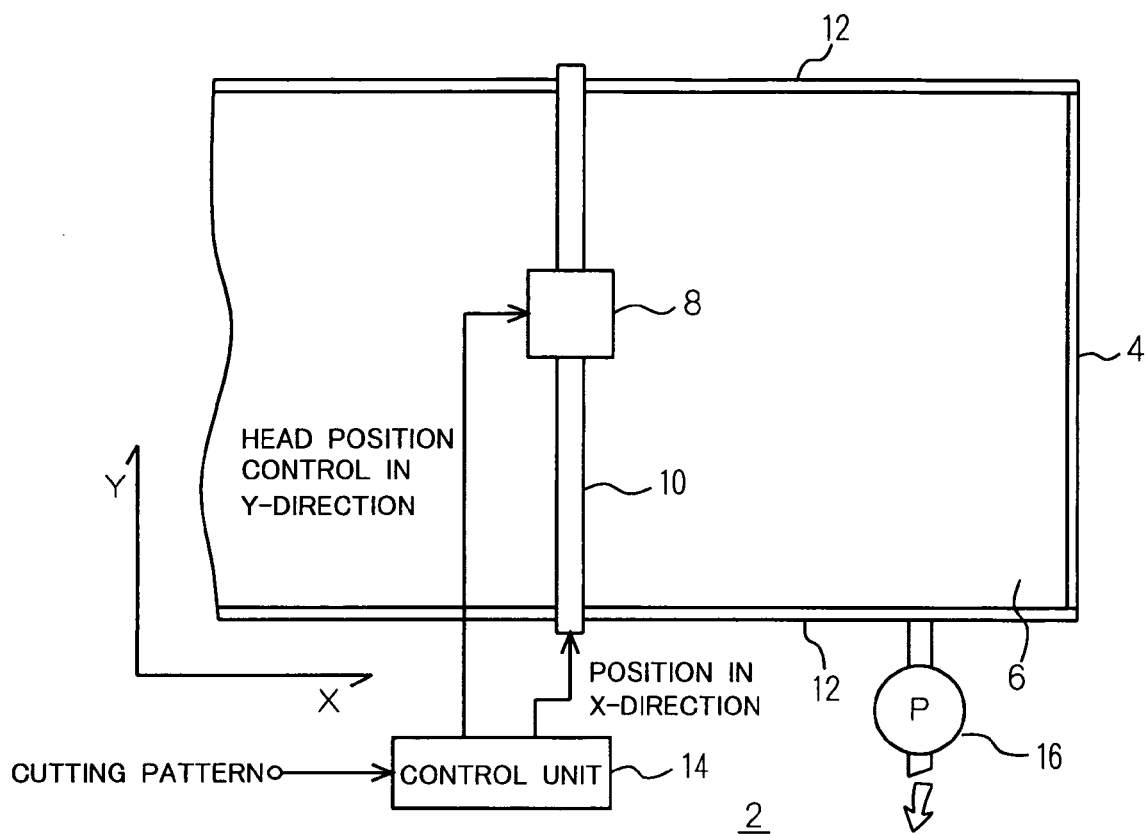
FIG. 1 is a plan view showing main components of a cutting apparatus according to an embodiment.

An embodiment and its modified embodiments will be described with reference to FIGS. 1 to 6. FIG. 1 shows a cutting apparatus 2 used in the embodiment. A reference numeral 4 denotes a table, and a reference numeral 6 denotes a bristle which is a brush fixed on the table 4. A member other than the bristle 6 may be used as long as it has air permeability, or air suction holes so that the sheet members can be fixed thereon by suction of a suction pump 16. A reference numeral 8 denotes a cutting head that moves on an arm 10 in a direction indicated by an arrow Y in FIG. 1. Since the arm 10 moves along a rail 12 in a direction indicated by an arrow X in FIG. 1, the cutting head 8 is movable in both of the directions indicated by the arrows X and Y relative to the rail 12. The head 8 includes a knife or a round blade for cutting the sheet members or the like, and a punch (notching tool) for stamping to make marks on the sheet members. The head 8 may include at least one of the knife and the punch. The head 8 cuts a bundle of the sheet members by moving the knife vertically. The sheet members are fixedly stacked on the bristle 6. A sheet of vinyl chloride covers the sheet members. If the number of the stacked sheet members is small, e.g., in the case of cutting one or two sheet members, the sheet members may be cut by the round blade. In this case, in the same manner as in the embodiment, the sheet members should be welded (i.e., fused) together using the knife or the punch such that the second sheet member next to the uppermost sheet member is not displaced on the lower sheet members.

A reference numeral 14 denotes a control unit. When a cutting pattern is inputted to the control unit 14, the control unit 14 controls movement of the head 8 in the directions indicated by the arrows X and Y, cutting, punching, welding and formation of uncut portions. The cutting pattern may be generated by the cutting apparatus 2. Alternatively, the cutting pattern may be generated by an external design apparatus. A reference numeral 16 denotes the suction pump for fixing the sheet members on the table 4 by vacuum suction through the bristle 6.

Figure 2:
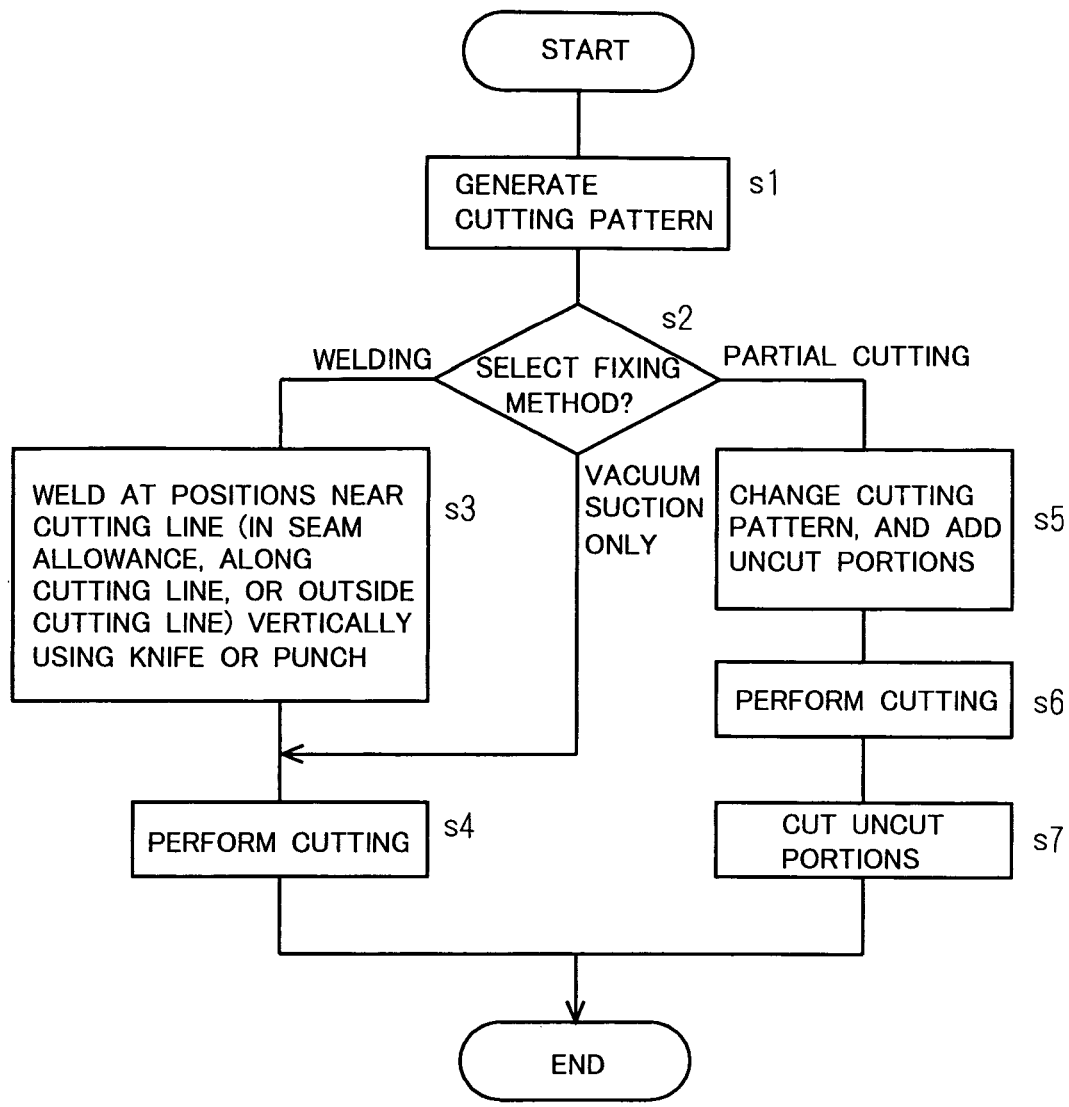
FIG. 2 is a flow chart showing an algorithm of a cutting method according to the embodiment.

FIG. 2 shows a cutting algorithm according to the embodiment. In step s1, a cutting pattern is generated. In step s2, a method of fixing the sheet members is selected. As the method of fixing the sheet members, a "welding method" and a "partial cutting method" can be used. In the welding (i.e., fusing) method, the sheet members are welded (i.e., fused) together vertically. In the "partial cutting method", uncut portions are provided at several positions along the cutting line. Further, it is possible to select another method in which neither the welding method nor the partial cutting method is carried out, and the sheet members are fixed only by vacuum suction. In the case of the welding method or the partial cutting method, vacuum suction is also carried out. The method selection of "welding", "partial cutting", or "other (vacuum suction only)" may be carried out manually by inputting the selected method into the control unit, or carried out automatically based on the data such as the material of the sheet members, the cutting pattern, or the like.

In the case of welding, the vertically stacked sheet members are welded together near the cutting line, i.e., in the seam allowance inside the cutting line, along the cutting line, or in a region outside the cutting line. The knife or the punch provided for the cutting head is used for welding. For example, the knife pierces the stacked sheet members at the welding position until the knife passes through many of the sheet members. By moving the knife at the same position vertically at high speed, the sheet members are welded together vertically by the frictional heat. In the case of using a punch like a drill, the punch is rotated to move downwardly into the stacked sheet members until the punch passes through many of the sheet members. The punch is rotated at the position to perform welding by the frictional heat. The word "many" herein means the number of the sheet members corresponding to about ½ to ¾ of the thickness of the stacked sheet members. In the case of using a punch like a knife, in the same manner as in the case of the cutting knife, the sheet members are welded together by moving the punch which has pierced into the stacked sheet members at high speed (step s3). After welding, the cutting is carried out (step s4). It is not necessary to carry out welding at several positions corresponding to the entire circumference of one part beforehand. In one method, after welding is carried out at one position for cutting one line, welding is carried out, e.g., at one position for the next line, and the line is cut. In the case of providing uncut portions, the cutting pattern is changed to add uncut portions at several positions along the cutting line (step s5). Then, the cutting is performed (step s6). Finally, the uncut portions are cut (step s7). The welding method and the partial cutting method can be used in combination. In this case, it is assumed that both of the welding method and the partial cutting method are selected in the algorithm.

Figure 3:
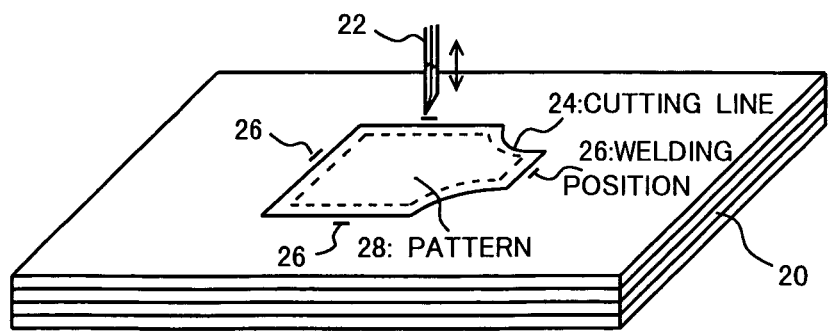
FIG. 3 is a view schematically showing an embodiment in which sheet members are welded together along a cutting line or in a region slightly outside the cutting line.
Figure 4:
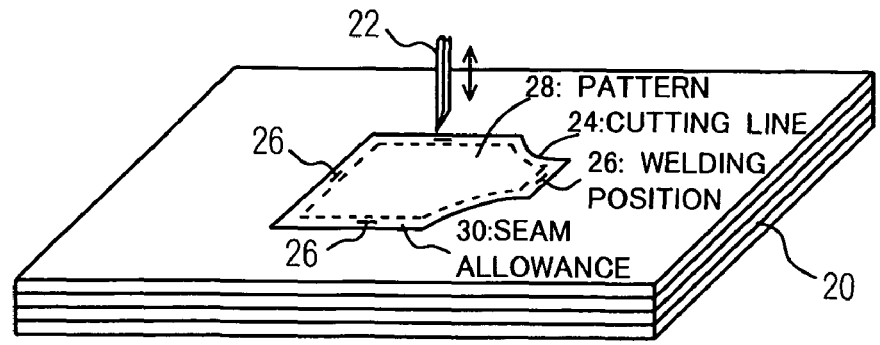
FIG. 4 is a view schematically showing an embodiment in which the sheet members are welded together in a seam allowance inside the cutting line.
Figure 5:
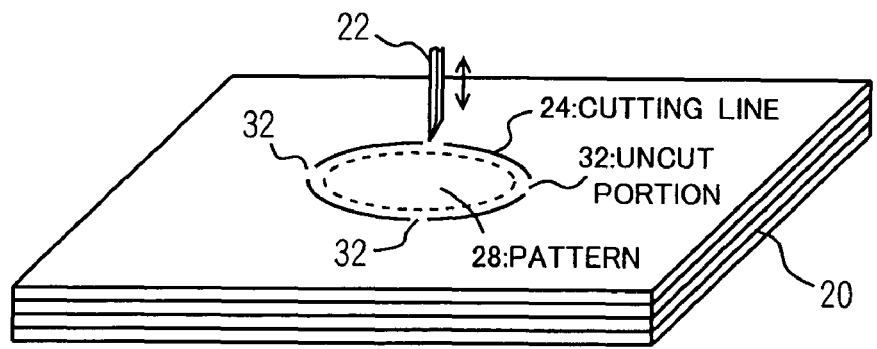
FIG. 5 is a view schematically showing an embodiment in which uncut portions are provided along the cutting line, and the uncut portions are cut finally.
Figure 6:
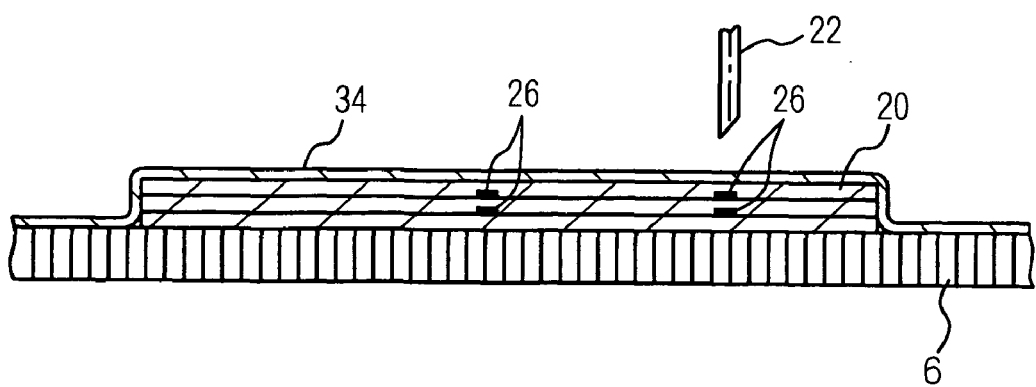
FIG. 6 is a view schematically showing welded positions between the sheet members in the respective embodiments shown in FIGS. 3 and 4.

FIG. 3 schematically shows an example in which several welding positions 26 are provided slightly outside the cutting line. A reference numeral 20 denotes a bundle having the thickness in the range of 2 cm to 5 cm produced by stacking a plurality of sheet members. The sheet members are sheets of material having air impermeability such as vinyl chloride or synthetic leather. In practice, a vinyl chloride sheet 34 having air-tightness shown in FIG. 6 is overlapped on the bundle 20 so that the vacuum suction can be carried out efficiently. In FIGS. 3 to 5, the vinyl chloride sheet is not shown. A reference numeral 22 denotes the knife provided for the cutting head. Other members such as a punch may be used instead of the knife 22. A rod-shaped member or the like having an internal heater may be provided for the cutting head, and welding may be performed by moving the rod-shaped member vertically.

By moving the knife 22 up and down, several, e.g., four welding positions 26 are provided outside the cutting line. The knife 22 pierces through the stacked sheet members at the welding positions 26. By moving the knife 22 vertically at each of the positions, the upper and lower sheet members are welded together, and thus, it is possible to fix the sheet members. Therefore, even if it is not possible to fix the upper and lower sheet members having air impermeability only by suction of the suction pump, cutting can be performed accurately. The welding positions 26 are provided outside the part, and the distance from the cutting line is very small, about 5 mm. Therefore, no trace of welding is exposed in other parts. Welding is performed, e.g., before cutting. Alternatively, welding and cutting may be performed alternately for each segment (one line of cutting), e.g., in a cycle of welding, cutting, welding, and cutting. A reference numeral 28 denotes a pattern in the part, which appears on the surface of the textile product after sewing, in the region inside the seam allowance.

FIG. 4 shows an example in which the welding positions 26 are provided in a seam allowance 30 inside the cutting line 24. In the example, the welding positions 26 are in the seam allowance 30, and are hidden by sewing. Therefore, no trace of welding is exposed in the product.

FIG. 5 shows an example in which uncut portions 32 are provided at several positions along the cutting line 24.

Preferably, the uncut portions 32 are provided, e.g., at corners of the part where the knife 22 is pulled out upwardly from the sheet members, and the orientation of the knife 22 is changed. Further, preferably, the length of the uncut portion 32 along the cutting line 24 is shorter than the width of the knife 22, i.e., the length of the knife 22 in the cutting direction. It is possible to combine the embodiment in FIG. 5 and the embodiments in FIGS. 3 and 4. For example, if another part is placed just outside the cutting line 24, the uncut portions 32 as shown in FIG. 5 should be provided. Further, if the embodiment in FIG. 3 and the embodiment in FIG. 4 are combined, and it is not possible to provide the welding positions 26 outside the cutting line 24, the welding positions 26 are provided using the seam allowance 30. Cutting may be performed using the knife 22. Alternatively, if the number of sheet members to be cut is small, a round blade (not shown) may be used. Since the head can select the suitable tool such as the knife, the punch, or the round blade during operation, for example, it is possible to perform welding using the knife or the punch, and perform cutting using the round blade.

FIG. 6 shows a cross section of the bundle 20 having the welding positions 26. The sheet members in the bundle 20 are sucked through the bristle 6 having the air permeability, and fixed on the table. Then, the vinyl chloride sheet 34 having air-tightness is overlapped on the bundle 20 for facilitating the vacuum suction. If the sheet members of the bundle 20 have air impermeability, it is difficult to fix the sheet members only by vacuum suction. Therefore, the welding method or the partial cutting method is utilized. Welding or formation of uncut portions, and cutting are carried out together for the vinyl chloride sheet 34 and the bundle 20. Therefore, at the time of welding, the knife 22 or the punch pierces from the upper side of the vinyl chloride sheet 34, and the sheet members of the bundle 20 on the lower side are welded together.

In the embodiment, the positions which are not exposed after sewing such as the positions along the cutting line, in the region outside the cutting line or in the seam allowance are utilized to fix the sheet members together. At the time of fixing the sheet members, the welding method or the partial cutting method is used. Thus, even if the slippery sheet members are stacked together, it is possible to cut the sheet members accurately. Further, the welding method and the partial cutting method can be carried out using the members provided for the head. Therefore, no additional members are newly required.

The invention claimed is:

1. A method of cutting sheet members, comprising the steps of:
   a) stacking a plurality of sheet members having air impermeability for cutting out a pattern piece from each of the sheet members;
   b) fixing the stack of sheet members by vacuum suction;
   c) welding the sheet members together vertically to fix upper and lower sheet members with respect to one another, said welding comprising locally heating at a weld location in a region of the sheet members near a predetermined cutting line of each pattern piece by frictional heat generated by contact between the sheet members and a knife or a punch of a cutting head, said welding includes piercing the stack with the knife or the punch at the weld location, moving the knife or the punch at the weld location to generate the frictional heat, and removing the knife or the punch from the stack at the weld location, wherein the region is a seam allowance of each pattern piece or a region outside the seam allowance of each pattern piece; and
   d) after performing step c, cutting the sheet members along the predetermined cutting line to cut out each pattern piece, wherein the predetermined cutting line extends along each pattern piece.

2. The method of cutting sheet members according to claim 1, wherein the region is the region outside the seam allowance, and the local heating step includes locally heating slightly outside the cutting line at a plurality of positions for each pattern piece.

3. The method of cutting sheet members according to claim 1, wherein the region is the seam allowance, and the local heating step includes locally heating inside the cutting line at a plurality of positions for each pattern piece.

\* \* \* \* \*